United States Patent [19]
Reynolds

[11] Patent Number: 5,677,837
[45] Date of Patent: Oct. 14, 1997

[54] DIAL A DESTINATION SYSTEM

[75] Inventor: James C. Reynolds, San Jose, Calif.

[73] Assignee: Trimble Navigation, Ltd., Sunnyvale, Calif.

[21] Appl. No.: 544,768

[22] Filed: Oct. 18, 1995

[51] Int. Cl.$^6$ ..................................... G05D 1/00
[52] U.S. Cl. ................ 364/424.028; 364/449.1; 364/449.5
[58] Field of Search ..................... 364/449, 443, 364/424.02, 449.1, 449.2, 449.3, 449.5, 449.7, 458, 460, 424.028, 424.029, 424.031, 424.027; 342/419

[56] References Cited

U.S. PATENT DOCUMENTS

| | | | |
|---|---|---|---|
| 4,956,777 | 9/1990 | Cearley et al. | 364/424.02 |
| 5,146,231 | 9/1992 | Ghaem et al. | 342/419 |
| 5,177,685 | 1/1993 | Davis et al. | 364/443 |
| 5,412,573 | 5/1995 | Barrea et al. | 364/449 |
| 5,452,212 | 9/1995 | Yokoyama et al. | 364/449 |
| 5,543,789 | 8/1996 | Behr et al. | 340/995 |

*Primary Examiner*—Kevin J. Teska
*Assistant Examiner*—Stephen J. Walder, Jr.
*Attorney, Agent, or Firm*—Wagner, Murabito & Hao

[57] ABSTRACT

A method and system for determining the location of a mobile position determining system with respect to a destination. In one embodiment, a mobile position determining system has a communication device coupled thereto. Position information of the mobile position determining system is transmitted, via the communication device, to a destination position information database. The destination position information database contains position information of at least one destination. A position comparator then generates range and bearing information indicative of the relative position of the mobile position determining system with respect to the at least one destination. An output device then reports the relative position of the mobile position determining system with respect to the at least one destination to a user of the mobile position determining system.

23 Claims, 2 Drawing Sheets

DIAL A DESTINATION SYSTEM

TECHNICAL FIELD

This invention relates to navigation systems. Specifically, the present invention relates to determining the relative position of a mobile position determining system with respect to a destination.

BACKGROUND ART

Prior art navigation systems typically inform a user of the user's current position. That is, conventional navigation devices display the user's current latitude, longitude, and elevation. Some prior art navigation devices display the user's position in a more user-friendly format. Specifically, certain prior art navigation devices display the user's position in familiar terms such as street addresses, and the like. Although such information is useful for providing the user's current location, such information is not always useful for locating a specific destination.

In an attempt to help users locate specific destinations such as, for example, hotels, points of interest, and the like, some navigation systems provide latitude, longitude, and elevation of selected destinations. Again, certain prior art navigation devices display the destination's position in familiar terms such as street addresses, and the like. However, specific street address information is not always helpful, for example, to a user who is unfamiliar with the streets and addresses near the desired destination.

Thus, a need exists for a navigation system which clearly directs a user to a desired direction, and a system which is useful even when the user is unfamiliar with the area in which the destination is located.

DISCLOSURE OF THE INVENTION

It is therefore an object of the present invention to provide a navigation system which clearly directs a user to a desired direction, and a system which is useful even when the user is unfamiliar with the area in which the destination is located. The above object has been achieved by a navigation system which reports the relative position of a user with respect to a desired location.

In one embodiment of the invention, a mobile position determining system has a communication device coupled thereto. Position information of the mobile position determining system is transmitted, via the communication device, to a destination position information database. The position information of the mobile position determining system includes, for example, the latitude, longitude, and elevation of the mobile position determining system. The destination position information database contains position information of the desired destination. Again, the position information of the destination includes, for example, the latitude, longitude, and elevation of the destination. A position comparator then generates, for example, range and bearing information indicative of the relative position of the mobile position determining system with respect to the destination. An output device then reports the relative position of the mobile position determining system with respect to the at least one destination to a user of the mobile position determining system. Thus, a user then utilizes the reported relative position information to locate the desired location.

Therefore, the present invention is not limited to merely reporting the user's current position. Likewise, the present invention is not limited to merely reporting the position information of a destination. Instead, the present invention directs the user to a desired destination by reporting the user's relative position with respect to the destination.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Figure 1:
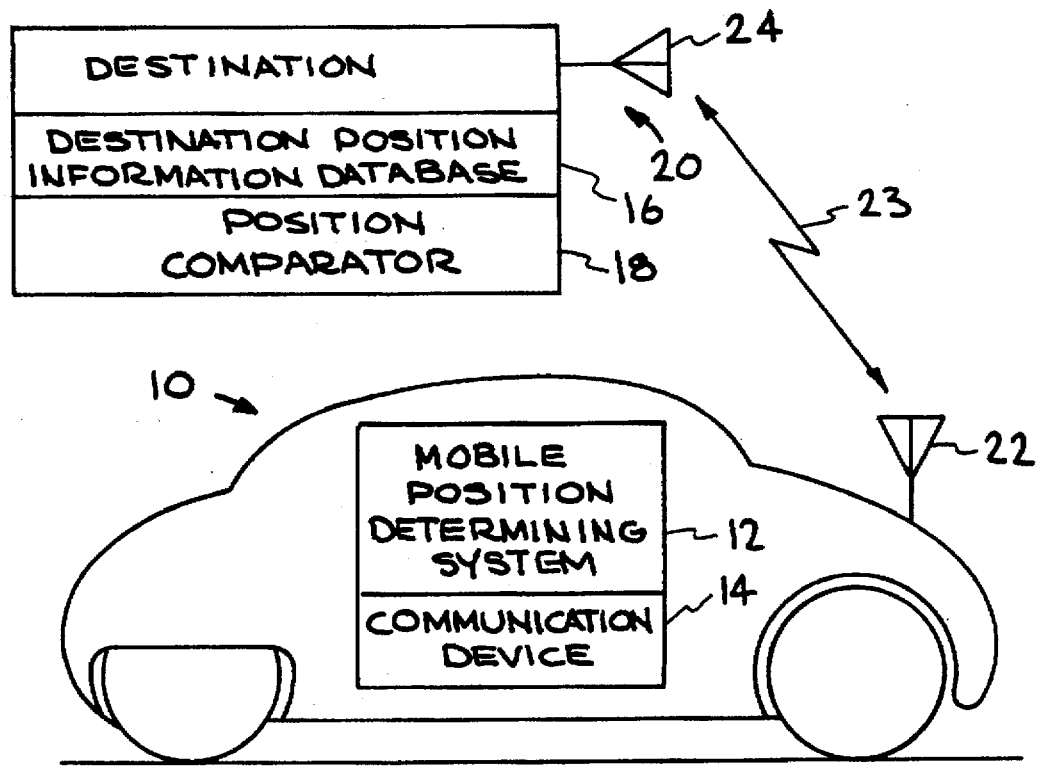
FIG. 1 is a schematic diagram of a destination locating system in accordance with the present claimed invention.

With reference now to FIG. 1, a schematic diagram of one embodiment of the present invention is shown. The following description of the present invention will begin with a detailed description of the physical characteristics of the present invention. This description will then be followed by a detailed description setting forth the operation of the present invention. Regarding the physical characteristics of the present embodiment, a vehicle 10 has mobile position determining system 12 attached thereto. With reference to the embodiment of FIG. 1, mobile position determining system 12 is shown attached to a personal vehicle. However, the present invention is also well suited to being attached to a commercial vehicle, to being hand-carried, and the like. As shown in FIG. 1, the present invention also includes a communication device 14 coupled to mobile position determining system 12. In the present embodiment, communication device 14 is a cellular telephone. Although communication device 14 is a cellular telephone in the present embodiment, the present invention is also well suited to the use of various other types of communication devices.

As shown in FIG. 1, the present invention also includes a destination position information database 16, and a position comparator 18. In the present embodiment, both destination position information database 16 and position comparator 18 are located at a destination 20. Destination position information database 16 includes the position information such as, for example, the latitude, longitude, and altitude of destination 20. In the present invention, destination 20 is, for example, a hotel, a point of interest, and the like.

Figure 2:
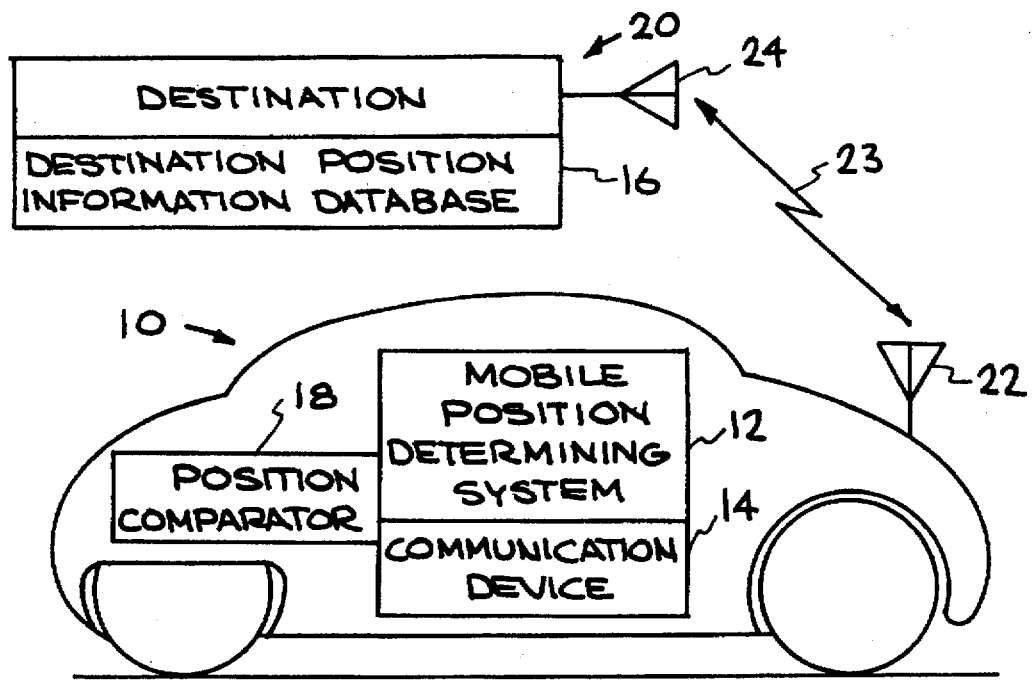
FIG. 2 is a schematic diagram of another embodiment of a destination locating system in accordance with the present claimed invention.

With reference next to FIG. 2 another embodiment of the present invention is shown in which position comparator 18 located is other than at destination 20. In the embodiment of FIG. 2, position comparator 18 is located, for example, in the trunk of vehicle 10.

Figure 3:
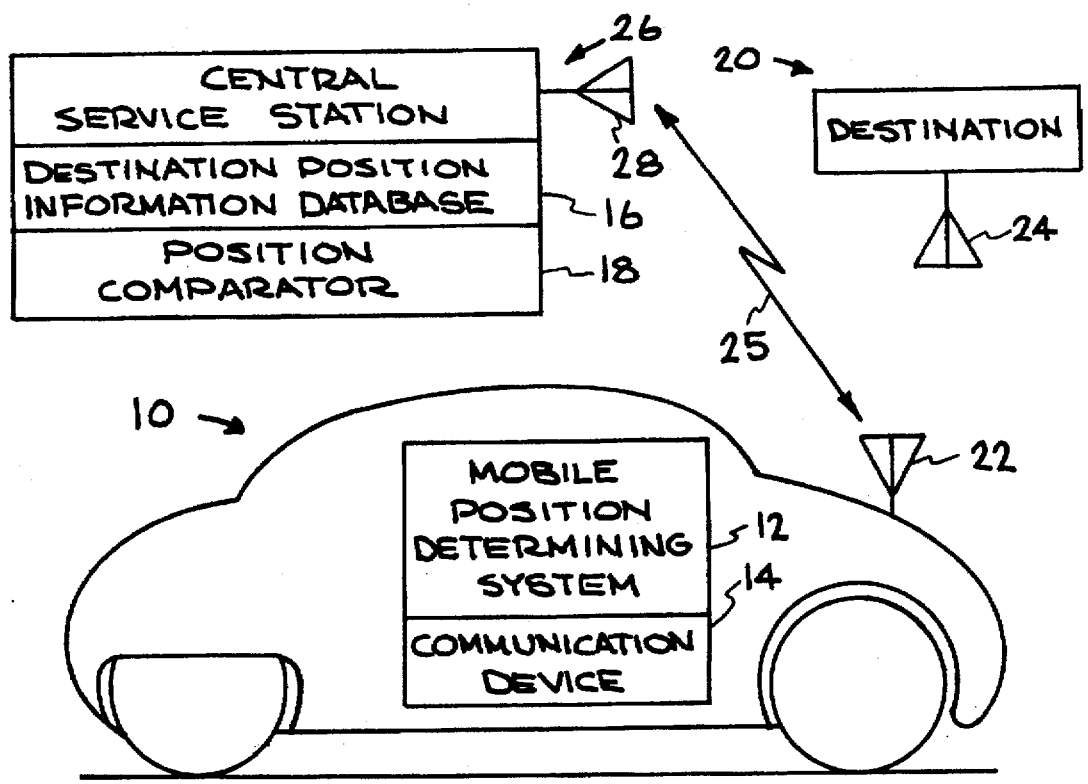
FIG. 3 is a schematic diagram of still another embodiment of a destination locating system in accordance with the present claimed invention.

Referring now to FIG. 3, still another embodiment of the present invention is shown in which a central service station 26 is employed. In the present embodiment, central service station 26 includes a destination position information database 16, and a position comparator 18. As mentioned above, destination position information database 16 includes the position information such as, for example, the latitude, longitude, and altitude of destination 20.

IN OPERATION

The following is a detailed description of the operation of the present invention. With reference to FIG. 1, mobile position determining system 12 generates position information indicating, for example, the latitude, longitude, altitude, and velocity of vehicle 10. Mobile position determining system 12 also accurately determines the time at which vehicle 10 is at a specific location. In the present invention, mobile position determining system 12 is, for example, a satellite-based radio navigation system such as the Global Positioning System (GPS), or the Global Orbiting Navigational System (GLONASS). Although such systems are specifically mentioned in the present embodiment, the present invention is also well suited to land-based radio navigation systems such as, for example, LORAN, Shoran, and Decca. Additionally, the present invention is also well suited to recording GPS ephemeris data. Likewise the present invention is also well suited to recording position information which has undergone differential corrections to provide more accurate position information.

Mobile position determining system 12 is also able to generate velocity information when vehicle 10 is moving. Velocity information is obtained by measuring the Doppler shifts of signals between an antenna of mobile position determining system 10 and navigation signal transmitters such as, for example, GPS satellites, not shown. The Doppler shift velocity measurements are obtained using well known and well understood techniques indigenous to the GPS receiver art. Thus, position information such as the speed, direction, and heading of vehicle 10 is obtained by mobile position determining system 12.

In the present embodiment, once a user wishes to find a destination, the user telephones destination 20 using communication device 14. As stated above, in the present embodiment, communication device 14 is a cellular telephone. When the destination is contacted by communication device 14, a communication link 23 is established between vehicle 10 and destination 20 via antennae 22 and 24. Thus, communication link 23 couples mobile position determining system 12 to destination 20 and, consequently, destination position information database 16 and position comparator 18.

Once communication link 23 is established, the position information of vehicle 10, as determined by mobile position determining system 12, is transmitted to destination 20. As stated above, destination 20 includes a destination position information database 16 and a position comparator 18. The position information of destination 20 is stored in destination position information database 16. In the present embodiment, the position information contained in destination position information database 16 includes the latitude, longitude, and elevation of destination 20.

In the present embodiment, use of the present invention can be initiated by several methods. For example, destination 20 such as a hotel, can be equipped with a separate, distinct, phone number which is dedicated to receiving and transmitting position information. When a telephone call is received on the dedicated phone line, the position information of vehicle 10 is automatically received, and compared, by position comparator 18, with the position information of destination 20. If a dedicated telephone line is not available, a user of the present invention simply requests the answerer to connect the user with the appropriate position comparator extension. Therefore, the present invention is easily implemented with minimal difficulty into existing destinations.

The transfer of position information from vehicle 10 to destination 20, via communication link 23, is also completed with minimal difficulty. In the present embodiment, the position information of vehicle 10 is transmitted using well-known DTMF signal processing techniques. Although such a technique is used in the present embodiment, the present invention is also well suited to using various other techniques to transfer the position information over communication link 23.

With reference still to FIG. 1, the position information of vehicle 12 and destination 20 are then compared by position comparator 18. Position comparator 18 determines the relative position of vehicle 10 with respect to destination 20. In the present embodiment, position comparator 18 generates information which indicates the range and bearing of vehicle 10 to destination 20. That is, the present invention is not limited to merely indicating the present location of vehicle 10 or destination 20. Instead, the present invention indicates where vehicle 10 is in relation to destination 20. Furthermore, in the present embodiment, position comparator 18 generates synthesized voice information indicating the relative position or range and bearing of vehicle 10 with respect to destination 20. For purposes of the present application, position information indicating the relative position of vehicle 10 with respect to destination 20 is referred to as relative position information.

In the present invention, after position comparator 18 generates the relative position information, the relative position information is then transmitted from destination 20 back to an output device. In the present embodiment, a speaker or ear piece of cellular telephone 14 functions as the output device. In the present embodiment, the synthesized voice information is played to an occupant of vehicle 10 using cellular telephone 14. As an example, the present invention is well suited to playing messages such as, for example, "Welcome to the Overnight Hotel, we are located 5 miles ahead on your right.", or "Thank you for calling the Art Museum, we are located ½ mile behind you on the left.", and the like. Although a synthesized voice message is generated in the present embodiment, the present invention is also well suited to generating various other types of messages indicating the relative position of vehicle 10 with respect to destination 20. The present invention is well suited, for example to generating a visual readout which is then displayed on an output such as, for example, the graphic display of cellular telephone 14. Although the present embodiment uses communication device 14 as the output device for the relative position information, the present invention is also well suited to using an audio and or video unit separate from communication device 14 as an output device. Hence, in the embodiment of FIG. 1, the present invention provides a synthesized voice message of the user's range and bearing to a selected destination.

With reference next to FIG. 2, a schematic diagram of another embodiment of the present invention is shown. In the embodiment of FIG. 2, position comparator 18 is located within vehicle 10. In the present embodiment, position comparator is shown located in the trunk of vehicle 10. The present invention is however, well suited to having position comparator 18 located elsewhere in vehicle 10. In the present embodiment, when requested, the position information of destination 20 as contained in destination position information database 16 is transmitted to vehicle 10 via communication link 23. The comparison of the position information of vehicle 10 with the position information of destination 20 is completed by position comparator 18 within vehicle 10. As in the embodiment of FIG. 1, position comparator 18 determines the relative position of vehicle 10 with respect to destination 20. Position comparator 18 then generates position information which indicates the range and bearing of vehicle 10 to destination 20. Furthermore, position comparator 18 generates synthesized voice information indicating the relative position or range and bearing of vehicle 10 with respect to destination 20. In the present embodiment, a speaker or ear piece of cellular telephone 14 functions as the output device. The synthesized voice information is played to an occupant of vehicle 10 using cellular telephone 14. Again, the present invention is also well suited to using an audio and or video unit separate from communication device 14 as an output device. Although a synthesized voice message is generated in the present embodiment, the present invention is also well suited to generating various other types of messages indicating the relative position of vehicle 10 with respect to destination 20. The present invention is well suited, for example to generating a visual readout which is then displayed on an output such as, for example, the graphic display of cellular telephone 14. Thus, for purposes of the present application, a video display is intended to include the display screen integral with a cellular telephone.

Referring now to FIG. 3, still another embodiment of the present invention is shown wherein destination position information database 16 and position comparator 18 are contained within a central service station 26 located separate from destination 20. In the present embodiment, position information for one destination or for a plurality of destinations is stored in the destination position information database at central service station 26. By storing the position information at central service station 26, the present invention eliminates the need for each destination to maintain its own destination position information database and position comparator on site.

With reference still to FIG. 3, once a user wishes to find a destination, the user telephones central service station 26 using communication device 14. As stated above, in the present embodiment, communication device 14 is a cellular telephone. When central service station 26 is reached, a communication link 25 is established between vehicle 10 and central service station 26 via antennae 22 and 28. Thus, communication link 25 couples mobile position determining system 12 to central service station 26 and, consequently, destination position information database 16 and position comparator 18.

Once communication link 25 is established, the position information of vehicle 10, as determined by mobile position determining system 12, is transmitted to central service station 26. The position information of at least one desired destination is stored in destination position information database 16. The position information contained in destination position information database 16 includes the latitude, longitude, and elevation of the at least one desired destination.

In the present embodiment, use of the present invention can be initiated by several methods. For example, a destination such as a hotel, will have its position information stored at the central service station. When a telephone call is received, for example, on a phone line dedicated to that particular destination, the position information of vehicle 10 is automatically received, and compared, by position comparator 18, with the position information of the particular desired destination.

As in the previous embodiments, the transfer of position information from vehicle 10 to central service station 26, via communication link 25, is also completed with minimal difficulty. In the present embodiment, the position information of vehicle 10 is transmitted using well-known DTMF signal processing techniques. Although such a technique is used in the present embodiment, the present invention is also well suited to using various other techniques to transfer the position information over communication link 25.

With reference still to FIG. 3, the position information of vehicle 12 and destination 20 are then compared by position comparator 18. Position comparator 18 determines the relative position of vehicle 10 with respect to the desired destination 20. In the present embodiment, position comparator 18 generates position information which indicates the range and bearing of vehicle 10 to destination 20. Furthermore, in the present embodiment, position comparator 18 generates synthesized voice information indicating the relative position or range and bearing of vehicle 10 with respect to destination 20.

In the present invention, after position comparator 18 generates the relative position information, the relative position information is then transmitted from destination 20 back to an output device. In the present embodiment, a speaker or ear piece of cellular telephone 14 functions as the output device. In the present embodiment, the synthesized voice information is played to an occupant of vehicle 10 using cellular telephone 14. Although a synthesized voice message is generated in the present embodiment, the present invention is also well suited to generating various other types of messages indicating the relative position of vehicle 10 with respect to destination 20. The present invention is well suited, for example to generating a visual readout which is then displayed on an output such as, for example, the graphic display of cellular telephone 14. Although the present embodiment uses communication device 14 as the output device for the relative position information, the present invention is so well suited to using an audio and or video unit separate from communication device 14 as an output device.

Figure 4:
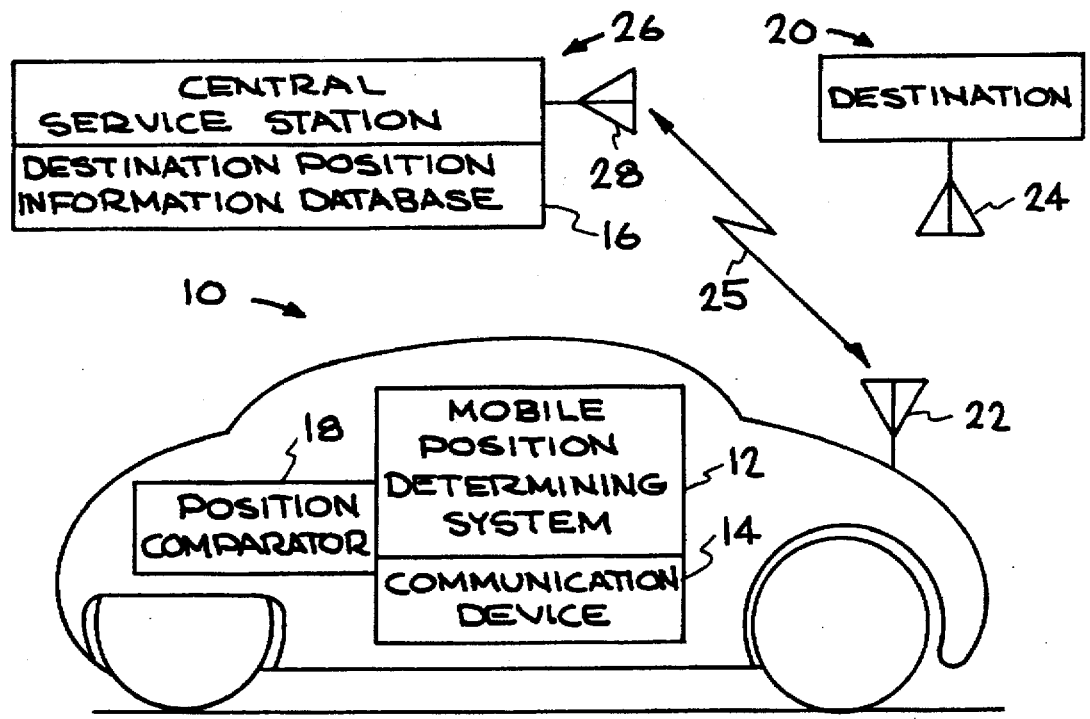
FIG. 4 is a schematic diagram of yet another embodiment of a destination locating system in accordance with the present claimed invention.

With reference next to FIG. 4, a schematic diagram of yet another embodiment of the present invention is shown in which position comparator 18 is located within vehicle 10. In the present embodiment, position comparator is shown located in the tank of vehicle 10. The present invention is however, well suited to having position comparator 18 located elsewhere in vehicle 10. In the present embodiment, when requested, the position information of destination 20 as contained in destination position information database 16 is transmitted to vehicle 10 from central service station 26 via communication link 25. The comparison of the position information of vehicle 10 with the position information of destination 20 is completed by position comparator 18 within vehicle 10. As in the embodiment of FIG. 1, position comparator 18 determines the relative position of vehicle 10 with respect to destination 20. Position comparator 18 then generates position information which indicates the range and bearing of vehicle 10 to destination 20. Furthermore, position comparator 18 generates synthesized voice information indicating the relative position or range and bearing of vehicle 10 with respect to destination 20. In the present embodiment, a speaker or ear piece of cellular telephone 14 functions as the output device. The synthesized voice information is played to an occupant of vehicle 10 using cellular telephone 14. Again, the present invention is also well suited to using an audio and or video unit separate from communication device 14 as an output device.

In the present invention, communication links 23 and 25 are established through any of various techniques. For example, communication links 23 and 25 can be established using a MetriComm Wide Area Network (WAN) link operating at approximately 900 MHz. Communication links 23 and 25 can be established using a standard cellular telephone connection. Communication links 23 and 25 can also be established using a trunked radio system. In such a system for example, communication device 14 first contacts headquarters or a communication base and is assigned a communication channel. Communication between communication device 14 and destination 20 or central service station 26 must take place over the assigned channel. Communication links 23 and 25 can also be established using a Cellular Digital Packet Data (CDPD) protocol. In the CDPD protocol, a modem and a radio are used to send data at a rate of 19.2 Kbits/s over cellular circuits not currently being used for voice transmissions. A control channel is called, for example, by communication device 14, and communication device 14 is then assigned a channel. Communication device 14 then bursts packet data, using, for example, TCP/IP protocol, to deliver the data to destination 20 until the data is completely transmitted or until the channel is no longer free. If the data is not completely transferred when the channel expires, communication links 23 and 25 are then established using a different channel. As yet another example, communication links 23 and 25 can be established using a Subscription Mobile Radio (SMR) system wherein an assigned frequency is used for communication links 23 and 25. The present invention is also well suited to having rf-based communication links 23 and 25.

Thus, the present invention provides a navigation system which clearly directs a user to a desired direction, and a system which is useful even when the user is unfamiliar with the area in which the destination is located. That is, the present invention reports the relative position of the user with respect to a destination without requiring the user to know street names, addresses, and the like.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

I claim:

1. A dial-a-destination position locating system comprising:

a mobile position determining system disposed within a vehicle, a cellular telephone system disposed within said vehicle, a destination position information database disposed separate from a vehicle in which said mobile position determining system is disposed, said destination position information database containing position information of a destination, said destination position information database adapted to be communicatively coupled to said mobile position determining system, said destination position information database having a telephone number associated with said position information of said destination such that said position information is accessed from said vehicle by dialing, on said cellular telephone, said telephone number associated with said destination, a position comparator communicatively coupled to said destination position information database, said position comparator generating information indicative of the relative position of said mobile position determining system with respect to said at least one destination, and an output device communicatively coupled to said position comparator, said output device reporting said relative position of said mobile position determining system with respect to said at least one destination, said output device disposed proximate to said mobile position determining system.

2. The dial-a-destination position locating system of claim 1 wherein said destination position information database contains position information for a plurality of destinations.

3. The dial-a-destination position locating system of claim 2 wherein said destination position information database containing position information for each of said plurality of destinations is located at a central service station.

4. The dial-a-destination position locating system of claim 2 wherein each of said plurality of destinations has respective position information stored in said destination position information database and said respective position information of each of said plurality of destinations has a respective telephone number associated therewith such that said position information of a respective destination is accessed by dialing, on said cellular telephone within said vehicle, said respective telephone number associated with said respective destination.

5. The dial-a-destination position locating system of claim 1 wherein said information generated by said position comparator includes synthesized voice information indicative of the relative position of said mobile position determining system with respect to said destination.

6. The dial-a-destination position locating system of claim 5 wherein said output device further comprises an audio speaker for audibly reporting said synthesized voice information indicative of the relative position of said mobile position determining system with respect to said destination.

7. The dial-a-destination position locating system of claim 1 wherein said position information database is communicatively coupled to said mobile position determining system via said cellular telephone.

8. The dial-a-destination position locating system of claim 1 wherein said information generated by said position comparator includes the range and bearing of said mobile position determining system to said destination.

9. The dial-a-destination position locating system of claim 1 wherein said output device further comprises a video display for visually reporting said information indicative of the relative position of said mobile position determining system with respect to said destination.

10. The dial-a-destination position locating system of claim 1 wherein said output device reports said information indicative of the relative position of said mobile position determining system with respect to said destination via said cellular telephone.

11. The dial-a-destination position locating system of claim 1 wherein said destination position information database is located at said destination such that said position information of said destination is accessed by dialing, on said cellular telephone within said vehicle, a telephone number associated with said destination.

12. The dial-a-destination position locating system of claim 1 wherein said position comparator is located proximate with said destination position information database, said position comparator generating said information indicative of the relative position of said mobile position determining system with respect to said destination upon the dialing, on said cellular telephone within said vehicle, said telephone number associated with said destination.

13. A method for determining the location of a vehicle having a mobile position determining system residing therein with respect to a destination by dialing a telephone number associated with the destination, said method comprising the steps of:

generating position information indicative of the location of a mobile position determining system, dialing a telephone number associated with a destination of a vehicle in which said mobile position determining system resides, transmitting said position information indicative of the location of said vehicle in which said mobile position determining system resides to a destination position information database located separately from said vehicle, said destination position information database containing position information of said destination, comparing said position information of said mobile position determining system with said position information of said destination, generating information indicative of the relative position of said vehicle in which said mobile position determining system resides with respect to said destination, and reporting said relative position of said vehicle in which said mobile position determining system resides with respect to said destination to a user of said mobile position determining system.

14. The method as recited in claim 13 wherein said step of generating information indicative of the relative position of said vehicle in which said mobile position determining system resides with respect to said destination further includes generating synthesized voice information indicative of the relative position of said vehicle in which said mobile position determining system resides with respect to said destination.

15. The method as recited in claim 14 wherein said step of reporting said relative position of said vehicle in which said mobile position determining system resides with respect to said destination to a user of said mobile position determining system further includes audibly reporting said synthesized voice information to a user of said mobile position determining system.

16. The method as recited in claim 13 wherein said step of transmitting said position information indicative of the location of said vehicle in which said mobile position determining system resides to a destination position information database further includes the step of transmitting said position information indicative of the location of said mobile position determining system from a cellular telephone in said vehicle in which said mobile position determining system resides to said destination position information database.

17. The method as recited in claim 13 wherein said step of generating information indicative of the relative position of said vehicle in which said mobile position determining system resides with respect to said destination further includes generating the range and bearing of said vehicle in which said mobile position determining system resides to said destination.

18. The method as recited in claim 13 wherein said step of reporting said relative position of said vehicle in which said mobile position determining system resides with respect to said destination to a user of said mobile position determining system further includes visually reporting said information to a user of said mobile position determining system.

19. The method for determining the position of a vehicle relative to a destination by dialing a telephone number associated with the destination as recited in claim 13 wherein said step of dialing a telephone number associated with a destination of a vehicle further comprises the step of:

dialing a destination position information database residing at a central service station.

20. The method for determining the position of a vehicle relative to a destination by dialing a telephone number associated with the destination as recited in claim 13 wherein said step of comparing said position information of said mobile position determining system with said position information of said destination is activated by dialing of said telephone number associated with said destination.

21. A dial-a-destination position locating system comprising:

a mobile position determining system disposed within a vehicle, a communication system disposed within said vehicle, said communication system adapted to be communicatively coupled to said mobile position determining system, a destination position information database located at a central service station separate from said vehicle, said destination position information database containing position information of a plurality of destinations, said destination position information database adapted to be communicatively coupled to said mobile position determining system via said communication system, said destination position information database having a respective identification number associated with said position information of respective destinations such that position information of a respective destination is accessed from said vehicle by contacting, on said communication system, said respective identification number associated with said respective destination, a position comparator generating range and bearing information indicative of the relative position of said mobile position determining system with respect to one of said plurality of said destinations, and an output device communicatively coupled to said position comparator, said output device reporting said relative position of said mobile position determining system with respect to said one of said plurality of said destinations, said output device integral with said communication system.

22. The dial-a-destination position locating system of claim 21 wherein said output device further comprises an audio speaker for audibly reporting synthesized voice information indicative of the relative position of said mobile position determining system with respect to said at least one destination.

23. The dial-a-destination position locating system of claim 21 wherein said output device further comprises a video display for visually reporting said information indicative of the relative position of said mobile position determining system with respect to said at least one destination.

* * * * *